United States Patent
Ishizuka et al.

(10) Patent No.: US 10,404,120 B2
(45) Date of Patent: Sep. 3, 2019

(54) STATOR OF ROTATING ELECTRIC MACHINE

(71) Applicant: DENSO CORPORATION, Kariya, Aichi-pref. (JP)

(72) Inventors: Atsuo Ishizuka, Kariya (JP); Akito Akimoto, Kariya (JP); Masayuki Takiguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 291 days.

(21) Appl. No.: 15/525,141

(22) PCT Filed: Nov. 6, 2015

(86) PCT No.: PCT/JP2015/081255
§ 371 (c)(1),
(2) Date: May 8, 2017

(87) PCT Pub. No.: WO2016/072481
PCT Pub. Date: May 12, 2016

(65) Prior Publication Data
US 2018/0287445 A1    Oct. 4, 2018

(30) Foreign Application Priority Data
Nov. 6, 2014    (JP) ................................. 2014-225925

(51) Int. Cl.
| H02K 3/04 | (2006.01) |
| H02K 3/14 | (2006.01) |
| H02K 1/16 | (2006.01) |

(52) U.S. Cl.
CPC ................ *H02K 3/14* (2013.01); *H02K 1/16* (2013.01)

(58) Field of Classification Search
CPC .. H02K 1/16; H02K 3/04; H02K 3/14; H02K 3/32
USPC ........ 310/201, 202, 203, 204, 205, 206, 207
See application file for complete search history.

(56) References Cited

U.S. PATENT DOCUMENTS

| 6,882,077 | B2 | 4/2005 | Neet | |
| 2001/0019234 | A1 | 9/2001 | Murakami et al. | |
| 2004/0263016 | A1 | 12/2004 | Neet | |
| 2005/0046297 | A1 | 3/2005 | Chen et al. | |
| 2006/0032040 | A1* | 2/2006 | Neet | H02K 3/12 29/596 |
| 2010/0052465 | A1* | 3/2010 | Hayashi | H02K 1/16 310/216.009 |
| 2010/0148620 | A1 | 6/2010 | Ishizuka et al. | |
| 2010/0148621 | A1 | 6/2010 | Ishizuka et al. | |

(Continued)

FOREIGN PATENT DOCUMENTS

JP    2008-253063 A    10/2008

*Primary Examiner* — Hanh N Nguyen
(74) *Attorney, Agent, or Firm* — Oliff PLC

(57) ABSTRACT

A stator includes a stator core having a plurality of slots arranged in a circumferential direction and a stator coil formed by wave-winding continuous coil wires on the stator core. Each of the continuous coil wires has in-slot portions received in the slots and turn portions each of which connects, on the outside of the slots, one pair of the in-slot portions. Each of the continuous coil wires has, at root parts of the turn portions respectively connected with ends of the in-slot portions, first crank portions that are radially bent. An amount of radial bending of the first crank portions is set to be half of a radial width of the in-slot portions.

7 Claims, 15 Drawing Sheets

(56) References Cited

U.S. PATENT DOCUMENTS

2011/0012471 A1* 1/2011 Dang .................. H02K 3/12
  310/201
2012/0112595 A1* 5/2012 Watanabe ............ H02K 3/12
  310/207

* cited by examiner

STATOR OF ROTATING ELECTRIC MACHINE

CROSS-REFERENCE TO RELATED APPLICATION

This application is based on and claims priority from Japanese Patent Application No. 2014-225925 filed on Nov. 6, 2014, the content of which is hereby incorporated by reference in its entirety into this application.

TECHNICAL FIELD

The present invention relates to stators of rotating electric machines that are used in, for example, motor vehicles as electric motors and electric generators.

BACKGROUND ART

There are known stators of rotating electric machines which generally include a stator core and a stator coil. The stator core has a plurality of slots arranged in a circumferential direction thereof. The stator coil is formed by wave-winding a plurality of continuous coil wires on the stator core. Each of the continuous coil wires has a plurality of in-slot portions received in the slots and a plurality of turn portions each of which connects, on the outside of the slots, one pair of the in-slot portions.

The continuous coil wires are formed to be long enough to extend around the stator core in the circumferential direction. There are known two patterns of arranging the in-slot portions of the continuous coil wires. The first pattern is a pattern (interlaced coil type) in which the in-slot portions are arranged alternately at two different layers in adjacent slots, as disclosed in Patent Document 1. The second pattern is a pattern (lap coil type) in which the in-slot portions are arranged at the same layer in adjacent slots, as disclosed in Patent Document 2. Moreover, Patent Document 3 discloses that to prevent interference between the continuous coil wires, crank portions, which are radially bent, are provided at root parts of the turn portions which are continuous with the in-slot portions.

PRIOR ART LITERATURE

Patent Literature

[PATENT DOCUMENT 1] Japanese Patent Application Publication No. JP2002176752A
[PATENT DOCUMENT 2] U.S. Pat. No. 6,882,077 B2
[PATENT DOCUMENT 3] Japanese Patent Application Publication No. JP2010166803A

SUMMARY OF THE INVENTION

Problems to be Solved by the Invention

However, in the case of providing the crank portions at the root parts of the turn portions as disclosed in Patent Document 3, the protruding height of the turn portions, which protrude from respective axial end faces of the stator core, is increased by the height of the crank portions. Therefore, in Patent Document 2, in order to reduce the protruding height of the turn portions, a cut is provided in an axial end portion of each wall surface of the stator core defining one slot so as to receive one crank portion therein. Moreover, the crank portions are reduced in cross-sectional area by being bent, and thus increased in electrical resistance. Consequently, the performance may be lowered due to heat generated by the crank portions.

The present invention has been made in view of the above circumstances. It is, therefore, an object of the present invention to provide a stator of a rotating electric machine which has no necessity of providing a cut in each wall surface of a stator core defining one slot and is capable of minimizing reduction in cross-sectional area of crank portions.

Means for Solving the Problems

According to the present invention which has been made for solving the above problems, there is provided a stator of a rotating electric machine. The stator includes:

a stator core (30) having a plurality of slots (31) arranged in a circumferential direction; and a stator coil (40) formed by wave-winding a plurality of continuous coil wires (50) on the stator core, each of the continuous coil wires having a plurality of in-slot portions (51) received in the slots and a plurality of turn portions (52) each of which connects, on the outside of the slots, one pair of the in-slot portions, wherein each of the continuous coil wires has, at root parts of the turn portions respectively connected with ends of the in-slot portions, first crank portions (54) that are radially bent, and an amount (A1) of radial bending of the first crank portions is set to be half of a radial width (C1) of the in-slot portions.

With the above configuration, each of the continuous coil wires has, at the root parts of the turn portions respectively connected with the ends of the in-slot portions, the first crank portions that are radially bent. The amount of radial bending of the first crank portions is set to be half of the radial width of the in-slot portions. Consequently, it is possible to set the amount of radial bending and the extending-direction length of the first crank portions to be respectively halves of those in the case of providing the first crank portions only on one side of the in-slot portions. Hence, it is possible to provide the first crank portions outside the respective axial end faces of the stator core. As a result, it is possible to suppress the protruding height of the turn portions, which protrude from the respective axial end faces of the stator core, to be low without providing cuts in wall surfaces of the stator core which define the slots. Moreover, it is also possible to minimize reduction in cross-sectional area of the first crank portions; thus it is possible to suppress increase in the electrical resistance, thereby preventing the performance from being lowered due to heat generated by the first crank portions.

In addition, the reference signs in parenthesis after members and parts described in this section and the claims only represent the correspondence with specific members and parts described in the following embodiments, and do not affect the configuration of each claim.

EMBODIMENTS FOR CARRYING OUT THE INVENTION

Hereinafter, embodiments of the present invention will be described in detail with reference to the drawings.

First Embodiment

A stator 20 of the present embodiment is used in, for example, a motor-generator that functions as an electric motor and an electric generator in a motor vehicle. A rotor (not shown) is rotatably received on an inner peripheral side of the stator 20. In an outer peripheral portion of the rotor, there are embedded a plurality of permanent magnets so as to be spaced at predetermined intervals in a circumferential direction. By the permanent magnets, a plurality of magnetic poles are formed whose polarities are alternately different in the circumferential direction. In the present embodiment, the number of the magnetic poles is set to 16 (8 N poles and 8 S poles).

Figure 1:
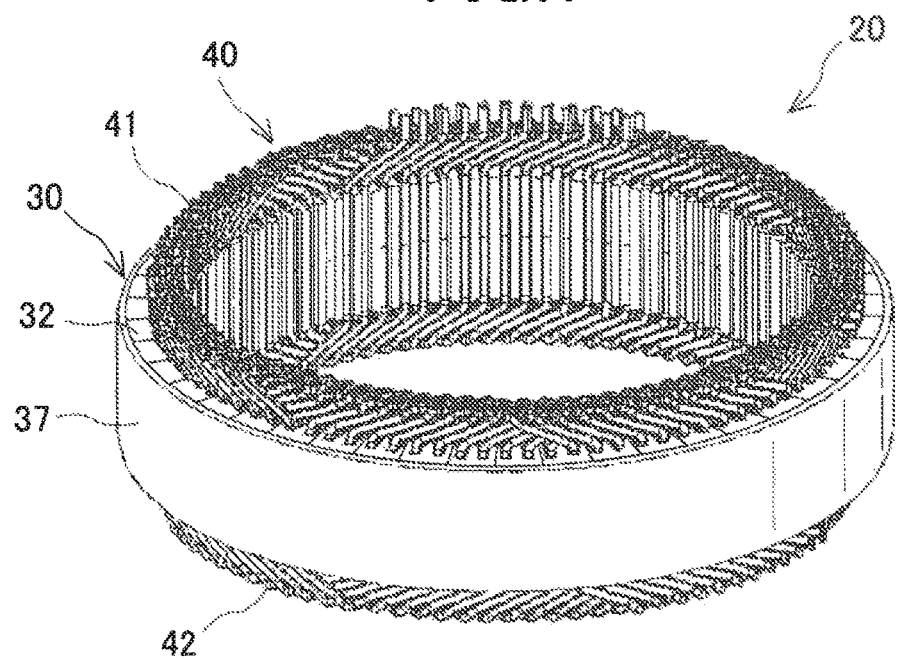
FIG. 1 is a perspective view of a stator of a rotating electric machine according to a first embodiment.
Figure 2:
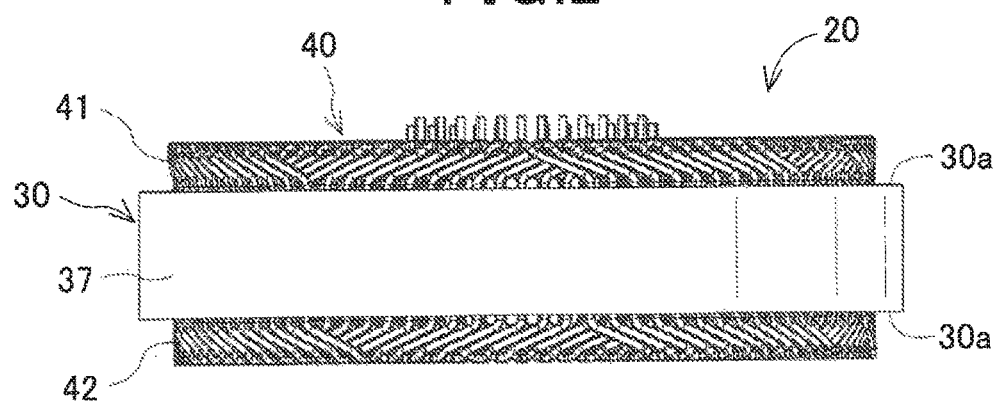
FIG. 2 is a side view of the stator of the rotating electric machine according to the first embodiment.
Figure 3:
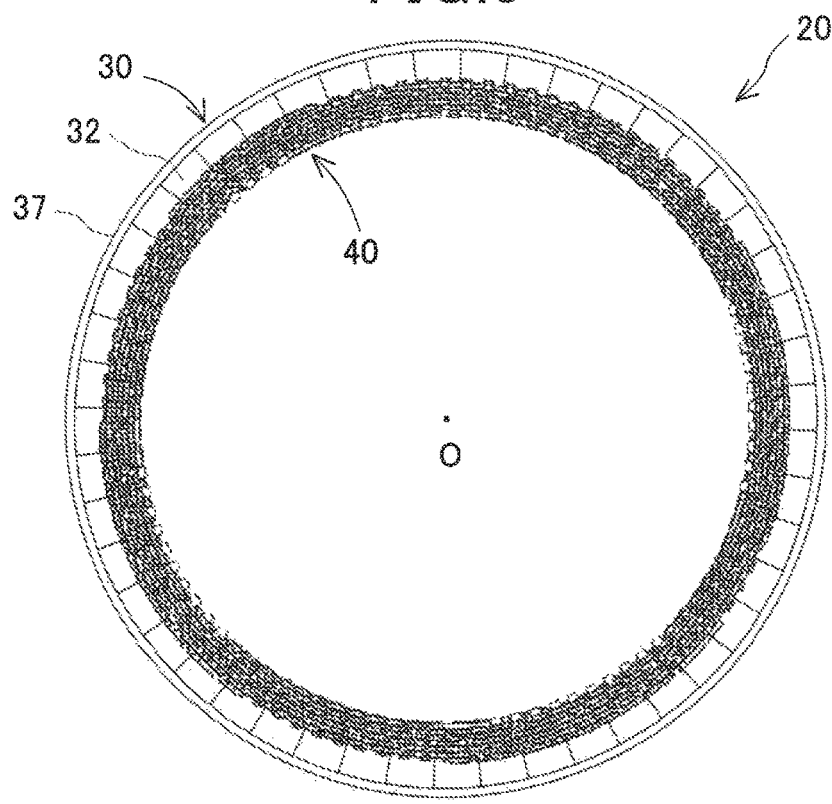
FIG. 3 is a plan view of the stator of the rotating electric machine according to the first embodiment.
Figure 4:
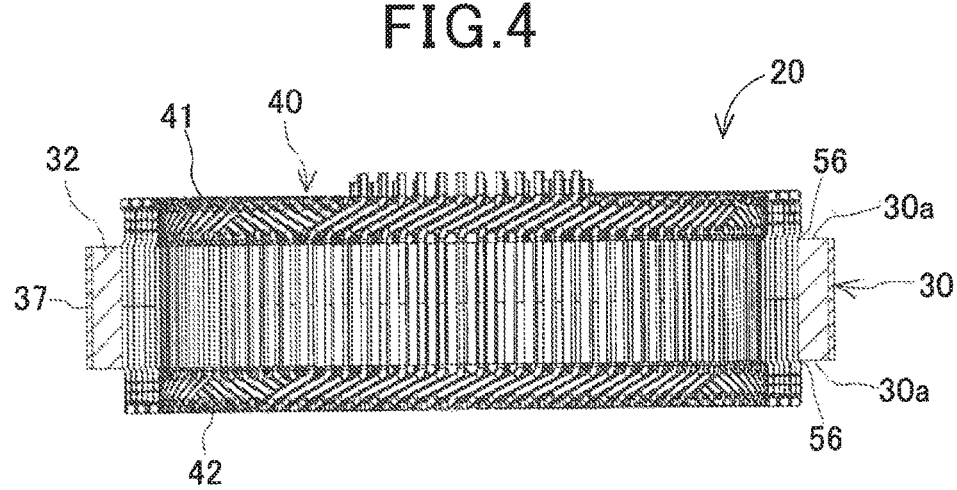
FIG. 4 is a cross-sectional view, taken along an axial direction, of the stator of the rotating electric machine according to the first embodiment.
Figure 5:
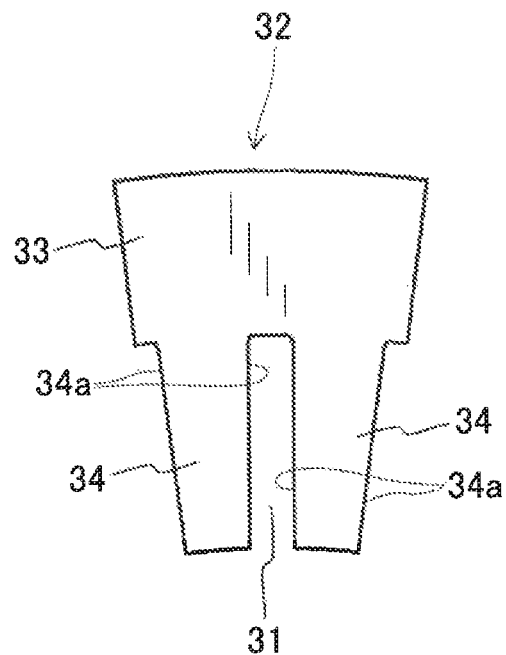
FIG. 5 is a plan view of a core segment according to the first embodiment.

As shown in FIGS. 1-4, the stator 20 includes an annular stator core 30 that is constituted of a plurality of core segments 32 and a three-phase (U phase, V phase and W phase) stator coil 40 that is formed of a plurality (12 in the present embodiment) of continuous coil wires 50 wave-wound on the stator core 30. The stator core 30 is formed by assembling the plurality (48 in the present embodiment) of core segments 32 (see FIG. 5), which are divided in the circumferential direction, into the annular shape. The stator core 30 has a plurality of slots 31 arranged in the circumferential direction on an inner periphery thereof. The plurality of core segments 32, which are assembled into the annular shape, are fixedly held by an outer cylinder 37 press-fitted on the outer peripheries thereof.

The stator core 30 includes an annular back core portion 33 located on the outer peripheral side and a plurality (96 in the present embodiment) of teeth 34 that each protrude radially inward from the back core portion 33 and are spaced at predetermined intervals in the circumferential direction. Consequently, between each circumferentially-facing pair of side surfaces 34a of adjacent teeth 34, there is formed one slot 31 that opens on the inner periphery of the stator core 30 and extends in an axial direction. Moreover, each slot 31 is formed so that its depth direction coincides with a radial direction. With respect to the number of the magnetic poles of the rotor (i.e., 16), the number of the slots 31 formed in the stator core 30 is equal to 2 (i.e., slot multiplier number is equal to 2) per phase of the stator coil 40. Accordingly, in the present embodiment, the total number of the slots 31 is equal to 96 resulting from 16×3×2=96.

Each of the core segments 32 constituting the stator core 30 is formed by laminating a plurality of magnetic steel sheets in the axial direction; the magnetic steel sheets are formed by press blanking into a predetermined shape. Between every adjacent two magnetic steel sheets, there is interposed an insulating film. In addition, each of the core segments 32 may also be formed of conventionally known steel sheets and insulating films instead of the laminate of magnetic steel sheets.

Figure 6:
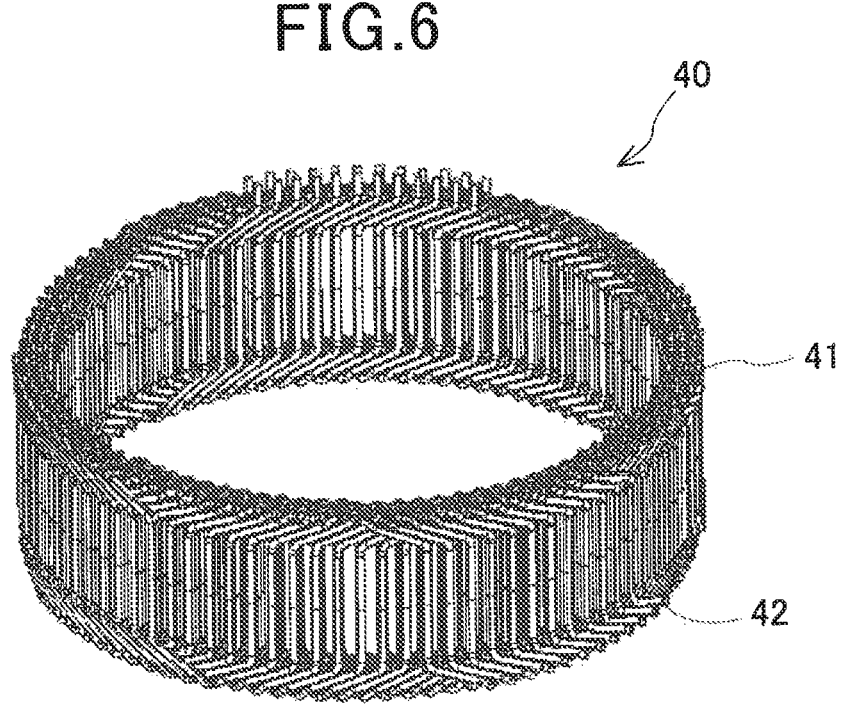
FIG. 6 is a perspective view of a stator coil according to the first embodiment.

As shown in FIG. 6, the stator coil 40 is formed by: forming a band-shaped coil wire bundle 60 (see FIG. 20) by bundling a plurality (12 in the present embodiment) of continuous coil wires 50, which are shaped into a predetermined wave-shape, into a predetermined state; and then spirally rolling the coil wire bundle 60 into a cylindrical shape.

Figure 7:
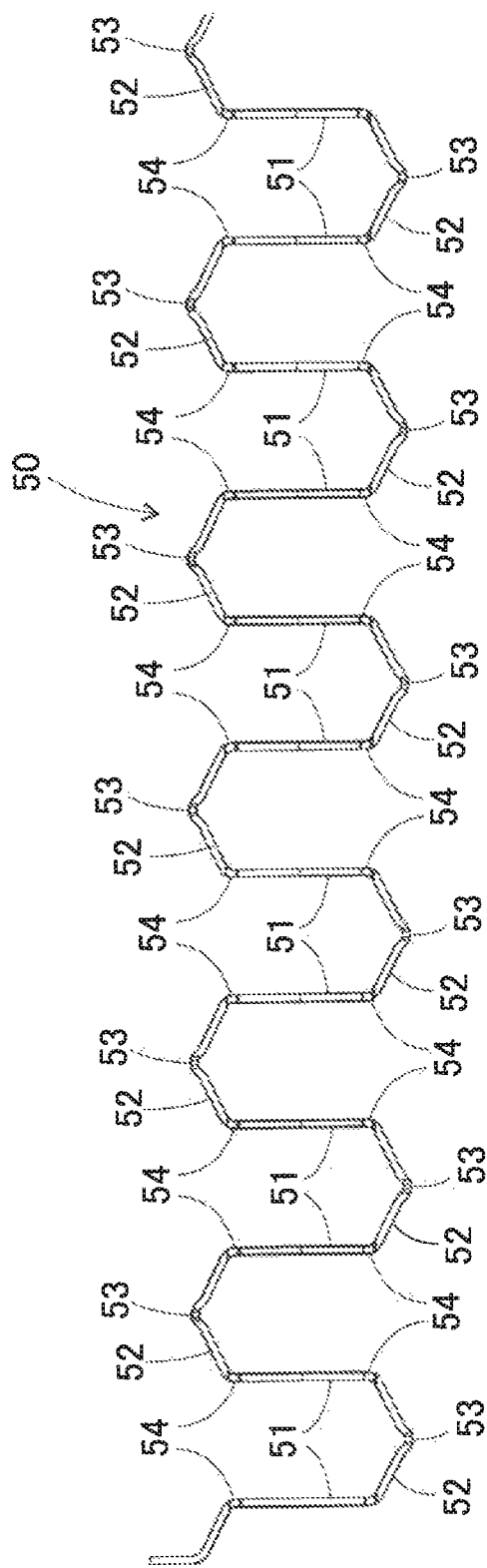
FIG. 7 is a front view of a continuous coil wire for forming the stator coil according to the first embodiment.

As shown in FIG. 7, each of the continuous coil wires 50 constituting the stator coil 40 is formed into a long waveshape. Each of the continuous coil wires 50 has a plurality of in-slot portions 51 and a plurality of turn portions 52. The in-slot portions 51 are parallel arranged along a longitudinal direction of the continuous coil wire 50 and received in the slots 31 of the stator core 30. The turn portions 52 protrude outside from the slots 31 and respectively connect corresponding ends of adjacent in-slot portions 51. Each of the continuous coil wires 50 is formed of a flat wire that includes an electric conductor and an insulating coat. The electric conductor is made of a material having high electrical conductivity, such as copper or aluminum, and has a rectangular cross section. The insulating coat covers the outer periphery of the electric conductor.

Each of the continuous coil wires 50 has, at an apex part of each of the turn portions 52, a second crank portion 53 that radially layer-changes the pair of in-slot portions 51 respectively connected with the two ends of the turn portion 52; the apex part is located at the center of the turn portion 52 and furthest from an axial end face 30a (see FIG. 2) of the stator core 30 axially outward. The amount of radial position change by the second crank portion 53 is set to be substantially equal to the radial width of each continuous coil wire 50. Thus, the pair of in-slot portions 51 respectively connected with the two ends of the turn portion 52 are received at two different layers in the respective slots 31; the two different layers are radially offset from each other by one layer.

Figure 8:
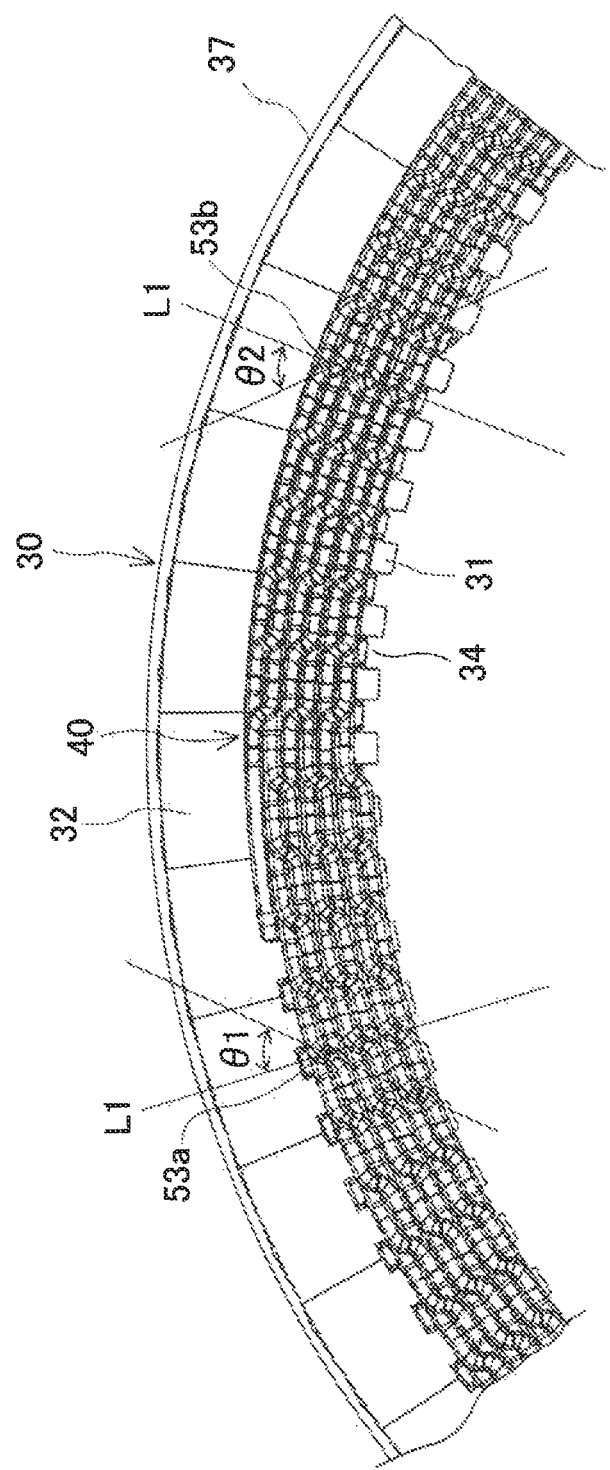
FIG. 8 is a front view of part of the stator of the rotating electric machine according to the first embodiment.

As shown in FIG. 8, each of the second crank portions 53 slants relative to a reference line L1 toward the circumferential direction; the reference line L1 radially extends from a central axis O (see FIG. 3) of the stator core 30. In the present embodiment, the second crank portions 53 include two types of second crank portions 53a and 53b having different slanting directions relative to the respective reference lines L1 toward the circumferential direction. Specifically, each of the second crank portions 53a slants, relative to the reference line L1, toward one circumferential side (clockwise direction) by an angle θ1. In contrast, each of the second crank portions 53b slants, relative to the reference line L1, toward the other circumferential side (counterclockwise direction) by an angle θ2. In addition, both the angles θ1 and θ2 are acute angles.

Figure 9:
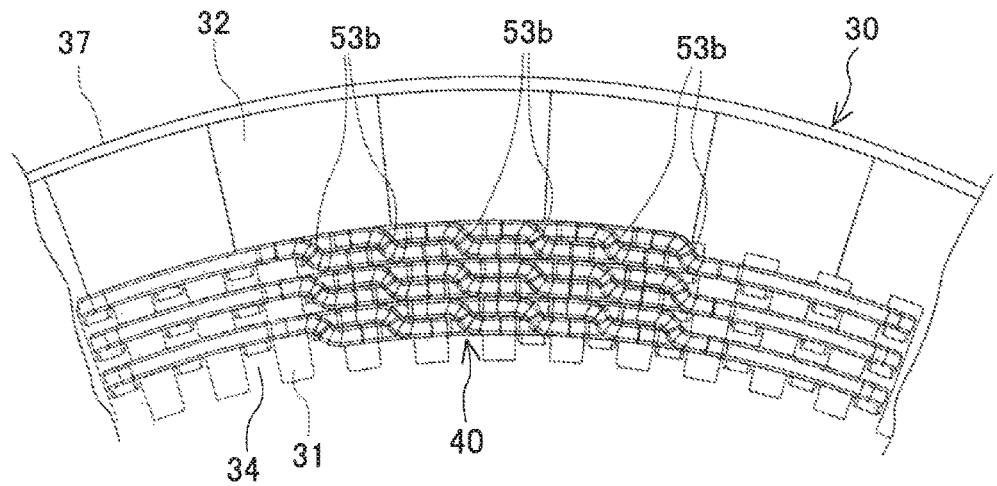
FIG. 9 is a front view of part of the stator of the rotating electric machine according to the first embodiment.
Figure 10:
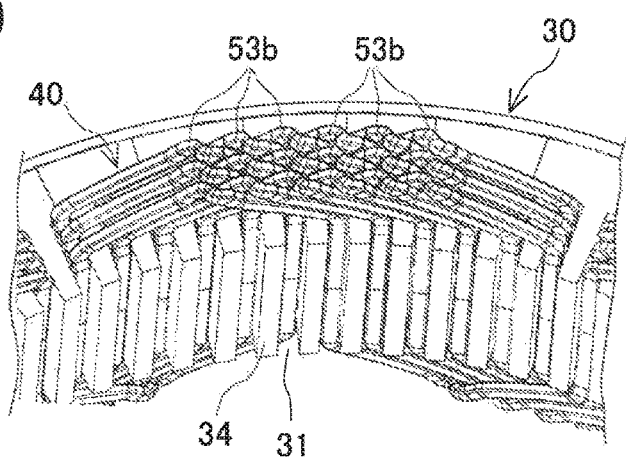
FIG. 10 is a perspective view of part of the stator of the rotating electric machine according to the first embodiment.
Figure 11:
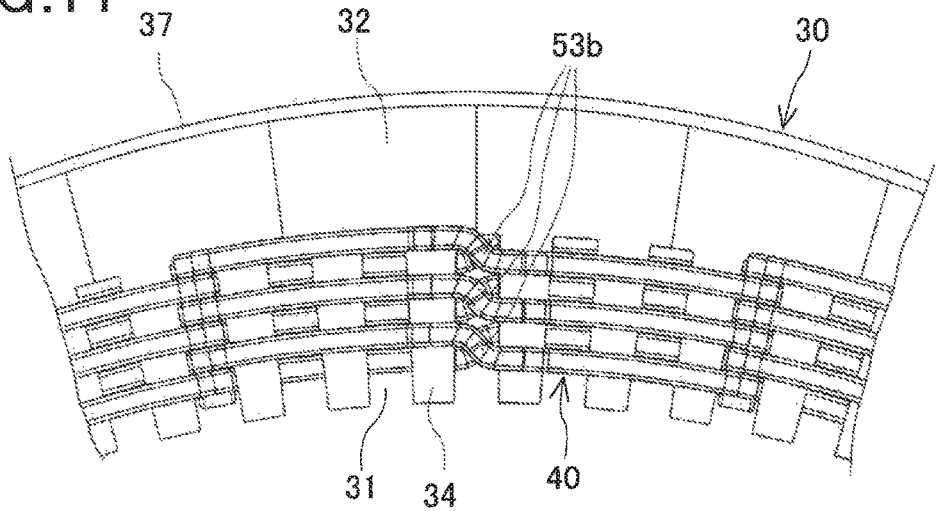
FIG. 11 is a front view of part of the stator of the rotating electric machine according to the first embodiment.
Figure 12:
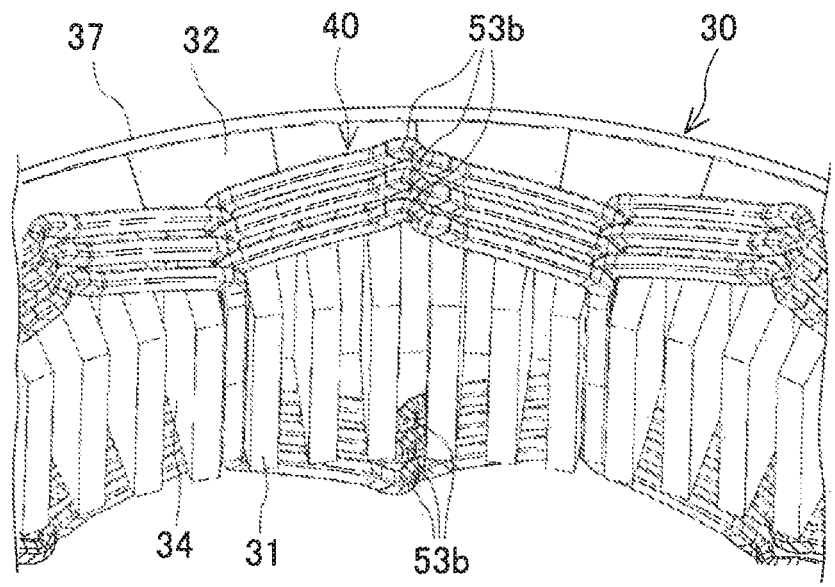
FIG. 12 is a perspective view of part of the stator e rotating electric machine according to the first embodiment.

The second crank portions 53a are irregularly arranged in the circumferential direction so that some of the second crank portions 53a are arranged singly while the remaining second crank portions 53a are arranged in groups. The second crank portions 53b are also irregularly arranged in the circumferential direction so that some of the second crank portions 53b are arranged singly while the remaining second crank portions 53b are arranged in groups. Moreover, there exist a plurality of locations where the second crank portions 53a are arranged alternately with the second crank portions 53b in the circumferential direction. For example, in FIGS. 9 and 10, there is shown a location where six second crank portions 53b (layer-changing portions) respectively provided in six of the twelve continuous coil wires 50 are arranged continuously in the circumferential direction. On the other hand, in FIGS. 11 and 12, there is shown a location where the second crank portions 53b (layer-changing portions) provided in the first and seventh ones of the twelve continuous coil wires 50 are arranged singly in the circumferential direction. In addition, the slanting angles θ1 and θ2 of the second crank portions 53a and 53b may each have a plurality of values.

Figure 13:
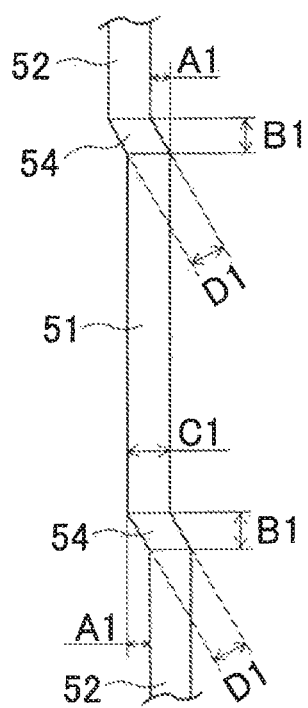
FIG. 13 is an explanatory diagram illustrating the configuration of first crank portions provided on both sides of an in-slot portion according to the first embodiment.

Moreover, as shown in FIG. 7, each of the continuous coil wires 50 has, at root parts of the turn portions 52 respectively connected with the ends of the in-slot portions 51 in the extending direction, first crank portions 54 that are radially bent. The first crank portions 54 are provided on both sides of each of the in-slot portions 51. Those first crank portions 54 which are bent radially outward from the respective ends of the in-slot portions 51 are provided in combination with those first crank portions 54 which are bent radially inward from the respective ends of the in-slot portions 51. As shown in FIG. 13, the amount A1 of radial bending of each of the first crank portions 54 is set to be half (C1/2) of the radial width C1 of each of the in-slot portions 51 and thus constant. Moreover, the amount A1 of radial bending of each of the first crank portions 54 is set to be half of the amount of radial position change by each of the second crank portions 53.

Figure 14:
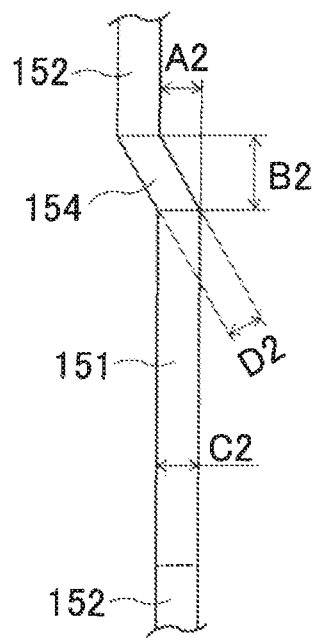
FIG. 14 is an explanatory diagram illustrating the configuration of a first crank portion provided only on one side of an in-slot portion according to a first comparative example.

As in a first comparative example shown in FIG. 14, in the case where a first crank portion 154 is provided only on one side of an in-slot portion 151, the amount A2 of radial bending of the first crank portion 154 is set to be equal to the radial width C2 (equal to C1) of the in-slot portion 151. In comparison, in the present embodiment, by providing the first crank portions 54 on both sides of each of the in-slot portions 51 in the extending direction, it becomes possible to set the amount A1 of radial bending of each of the first crank portions 54 to be half (C1/2) of the radial width C1 of each of the in-slot portions 51.

Moreover, the extending-direction length B1 of each of the first crank portions 54 in the present embodiment is set to be half (B2/2) of the extending-direction length B2 of the first crank portion 154 in the first comparative example. Further, the radial width D1 of each of the first crank portions 54 in the present embodiment is set to be greater than the radial width D2 of the first crank portion 154 in the first comparative example. That is, the cross-sectional area of each of the first crank portions 54 in the present embodiment is greater than the cross-sectional area of the first crank portion 154 in the first comparative example. Consequently, in the present embodiment, reduction in the cross-sectional area of each of the first crank portions 54 is minimized, thereby suppressing increase in the electrical resistance.

Figure 15:
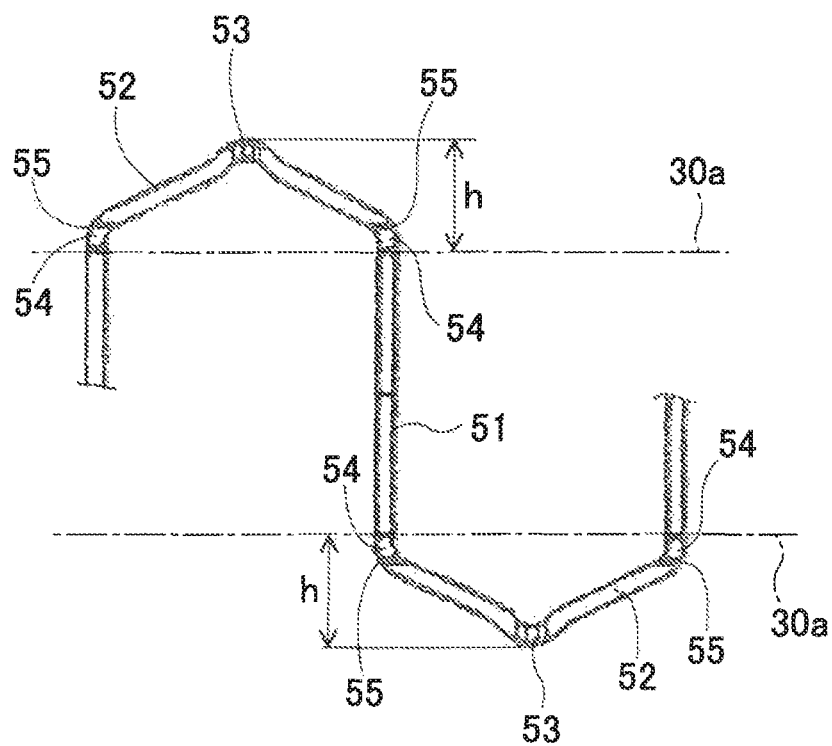
FIG. 15 is an explanatory diagram illustrating the state of first crank portions provided in a continuous coil wire according to the first embodiment.
Figure 16:
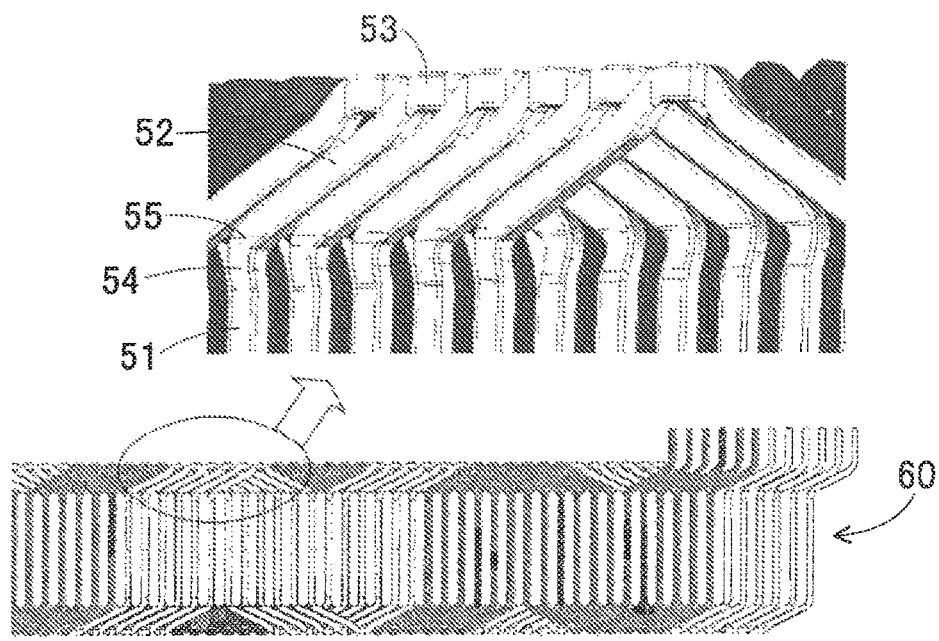
FIG. 16 is an explanatory diagram illustrating the state of first crank portions provided in a coil wire bundle according to the first embodiment.

Moreover, in the present embodiment, as shown in FIG. 15, each of the turn portions 52 has, at both ends thereof, bent R portions 55 that are circumferentially bent so as to be curved. Each of the first crank portions 54 is provided to partially overlap one of the bent R portions 55. Consequently, the protruding height h of the turn portions 52 that protrude from the respective axial end faces 30a of the stator core 30 is suppressed to be low. In addition, as shown in FIG. 16, each of the bent R portions 55 provided in the turn portions 52 is positioned so as not to interfere with adjacent other bent R portions 55. Therefore, though each of the first crank portions 54 is provided to partially overlap one of the bent R portions 55, no interference occurs between the first crank portions 54.

Figure 17:
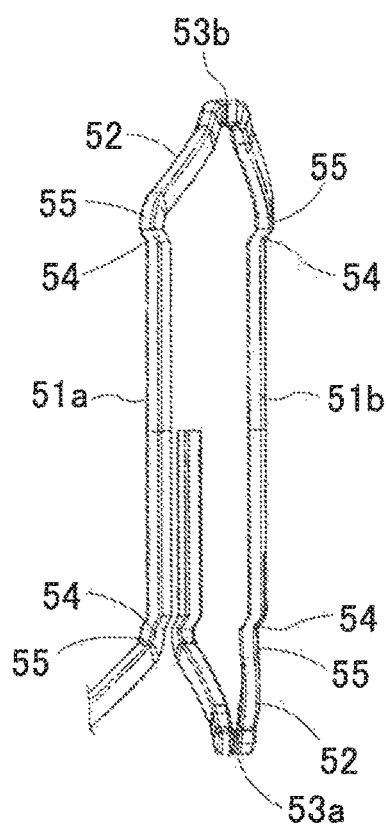
FIG. 17 is an explanatory diagram illustrating a combination of bending directions of first crank portions provided on both sides of in-slot portions according to the first embodiment.
Figure 18:
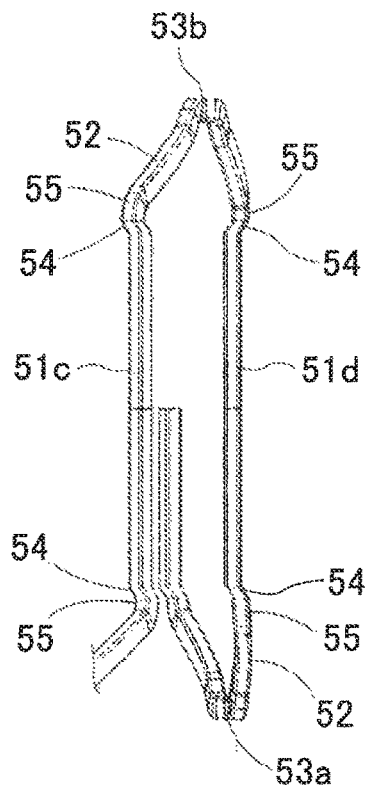
FIG. 18 is an explanatory diagram illustrating another combination of bending directions of first crank portions provided on both sides of in-slot portions according to the first embodiment.

In the present embodiment, as shown in FIGS. 17 and 18, there are four patterns of combinations of the bending directions of the first crank portions 54 provided on both sides of the in-slot portions 51. Specifically, in FIG. 17, the bending directions of the first crank portions 54 provided on both sides of one in-slot portion 51*a* are (inward, inward), while the bending directions of the first crank portions 54 provided on both sides of the other in-slot portion 51*b* are (outward, inward). Moreover, in FIG. 18, the bending directions of the first crank portions 54 provided on both sides of one in-slot portion 51*c* are (inward, outward), while the bending directions of the first crank portions 54 provided on both sides of the other in-slot portion 51*d* are (outward, outward).

In the above explanation, "inward" denotes the bending direction in the case where the first crank portions 54 are bent radially inward from the respective ends of the in-slot portions 51; "outward" denotes the bending direction in the case where the first crank portions 54 are bent radially outward from the respective ends of the in-slot portions 51. Moreover, in the case where the bending direction of the first crank portions 54 is "outward", there are formed recesses 56 between the first crank portions 54 and the respective axial end faces 30*a* of the stator core 30 (see FIGS. 4 and 28). In addition, in the continuous coil wire 50 shown in FIGS. 17 and 18, the second crank portions 53*b* are provided in the upper turn portions 52 while the second crank portions 53*a* are provided in the lower turn portions 52; however, in the case where the slanting directions of the second crank portions 53 provided in the turn portions 52 are inverted, the above-described four patterns are still applied.

Figure 19:
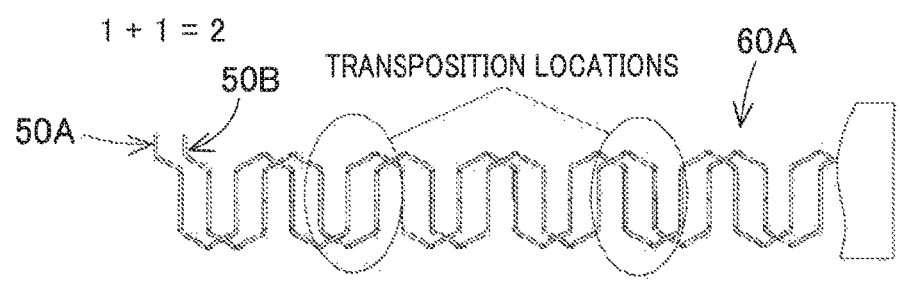
FIG. 19 is an explanatory diagram illustrating a coil wire bundle obtained by interlacing one continuous coil wire and another continuous coil wire according to the first embodiment.

As shown in FIGS. 19-22, the coil wire bundle 60 of the present embodiment is formed by bundling the continuous coil wires 50 into a predetermined state. First, as shown in FIG. 19, one continuous coil wire 50A and another continuous coil wire 50B are bundled into a state of being transposed (i.e., having their positions interchanged) at a plurality of locations, thereby forming a coil wire bundle 60A that is constituted of the two continuous coil wires 50A and 50B.

In the coil wire bundle 60A, the continuous coil wires 50A and 50B are interlaced so as to be transposed at intervals of 2.5 ridges. That is, in the case of ordinary continuous interlacing, the continuous coil wires 50A and 50B would be interlaced so as to be transposed at intervals of 0.5 ridges. In comparison, in the present embodiment, the continuous coil wires 50A and 50B are interlaced skipping two ridges (the circumferential length of two turn portions 52). Consequently, in the range where the continuous coil wires 50 extend in the circumferential direction of the stator core 30 by one complete turn, all of the intervals between adjacent transposition locations are equal to 2.5 ridges (i.e., greater than or equal to the circumferential length of one turn portion 52).

In addition, 2.5 ridges represent the range corresponding to the circumferential length of 2.5 turn portions 52 of each continuous coil wire 50 located on both sides of the in-slot portions 51 in the extending direction. Moreover, in the case of the coil wire bundle 60 formed by bundling the plurality of continuous coil wires 50, 2.5 ridges represent the range corresponding to the circumferential length of 2.5 turn portion groups located on both sides of the in-slot portions 51 in the extending direction; each turn portion group consists of a plurality of turn portions 52 bunched together.

In the present embodiment, the interlacing of the two continuous coil wires 50A and 50B is performed as follows. First, the two continuous coil wires 50A and 50B are placed so as to face each other and be offset from each other by two slot-pitches in the longitudinal direction (the direction of central axes thereof). Next, with one end of each of them in the longitudinal direction fixed, the two continuous coil wires 50A and 50B are revolved relative to each other such that each of them revolves around the central axis of the other. More specifically, the two continuous coil wires 50A and 50B are interlaced by making them come together for every relative revolution of 180°, at intervals of 2.5 ridges and in the state of being transposed relative to each other on the upper and lower sides in FIG. 19. Consequently, the two continuous coil wires 50A and 50B are bundled into the state of being offset from each other by two slot-pitches in the longitudinal direction, thereby forming the coil wire bundle 60A.

In addition, each transposition location between the continuous coil wires 50A and 50B exists between adjacent turn portions 52 of the continuous coil wires 50A and 50B. Moreover, the transposition locations between the continuous coil wires 50A and 50B exist on both sides of the in-slot portions 51 of the continuous coil wires 50A and 50B in the extending direction.

Figure 20:
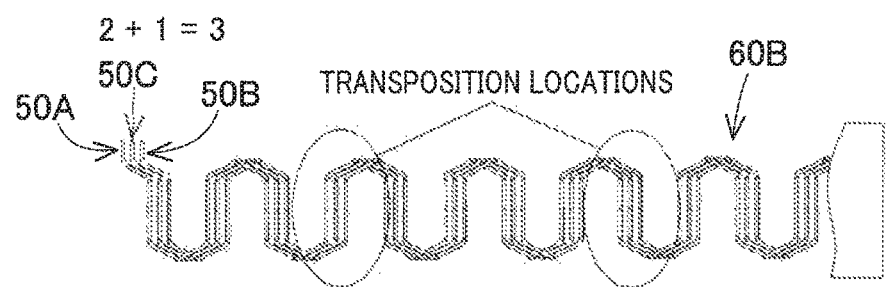
FIG. 20 is an explanatory diagram illustrating a coil wire bundle obtained by interlacing a bundle of two continuous coil wires and a continuous coil wire according to the first embodiment.

Next, as shown in FIG. 20, one coil wire bundle 60A and one continuous coil wire 50C are bundled into a state of being transposed at a plurality of locations, thereby forming a coil wire bundle 60B that is constituted of the three continuous coil wires 50A-50C. The coil wire bundle 60B is interlaced, as the coil wire bundle 60A, so that the three continuous coil wires 50A-50C are transposed at intervals of 2.5 ridges. More specifically, the interlacing of the coil wire bundle 60A and the continuous coil wire 50C is performed, with the continuous coil wire 50C arranged at the center position in the offset direction between the two continuous coil wires 50A and 50B constituting the coil wire bundle 60A, in the same manner as described above. Consequently, the three continuous coil wires 50A-50C are bundled into a state of being offset from one another by one slot-pitch in the longitudinal direction.

Figure 21:
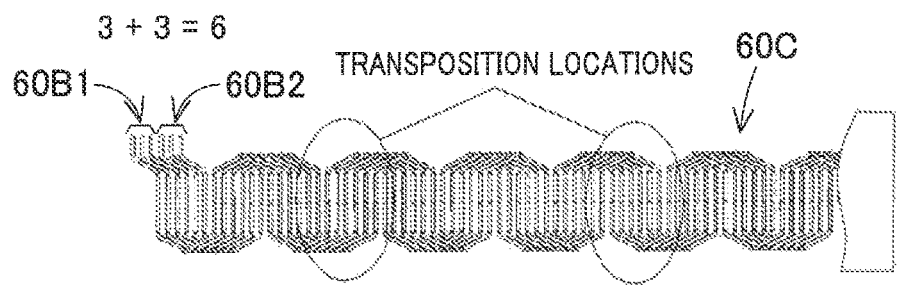
FIG. 21 is an explanatory diagram illustrating a coil wire bundle obtained by interlacing a bundle of three continuous coil wires and another bundle of three continuous coil wires according to the first embodiment.

Next, as shown in FIG. 21, a first coil wire bundle 60B1 and a second coil wire bundle 60B2 are bundled into a state of being transposed at a plurality of locations, thereby forming a coil wire bundle 60C that is constituted of six continuous coil wires 50A-50C. The coil wire bundle 60C is interlaced so that the six continuous coil wires 50A-50C are transposed at intervals of 2.5 ridges. More specifically, the interlacing of the first and second coil wire bundles 60B1 and 60B2 is performed, with the first and second coil wire bundles 60B1 and 60B2 offset from each other by three slot-pitches in the longitudinal direction, in the same manner as described above. Consequently, the six continuous coil wires 50A-50C constituting the first and second coil wire bundles 60B1 and 60B2 are bundled into a state of being offset from one another by one slot-pitch in the longitudinal direction.

Figure 22:
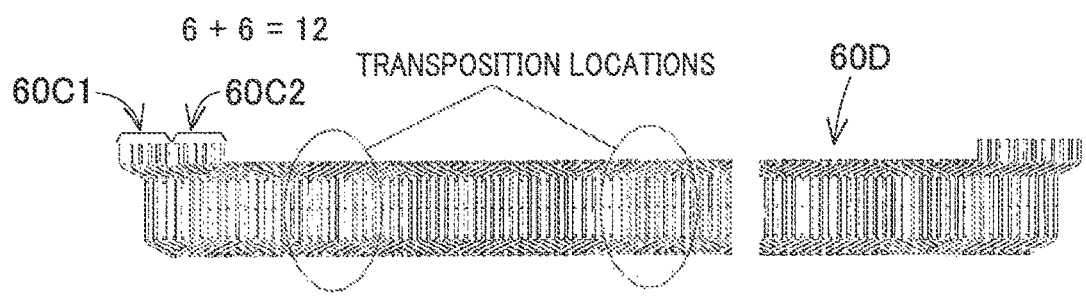
FIG. 22 is an explanatory diagram illustrating a coil wire bundle obtained by interlacing a bundle of six continuous coil wires and another bundle of six continuous coil wires according to the first embodiment.

Next, as shown in FIG. 22, a first coil wire bundle 60C1 and a second coil wire bundle 60C2 are bundled into a state of being transposed at a plurality of locations, thereby forming a coil wire bundle 60D that is constituted of twelve continuous coil wires 50A-50C. The coil wire bundle 60D is interlaced, with the first and second coil wire bundles 60C1 and 60C2 offset from each other by six slot-pitches in the longitudinal direction, in the same manner as described above so that the first and second coil wire bundles 60C1 and 60C2 are transposed at intervals of 2.5 ridges.

Figure 23:
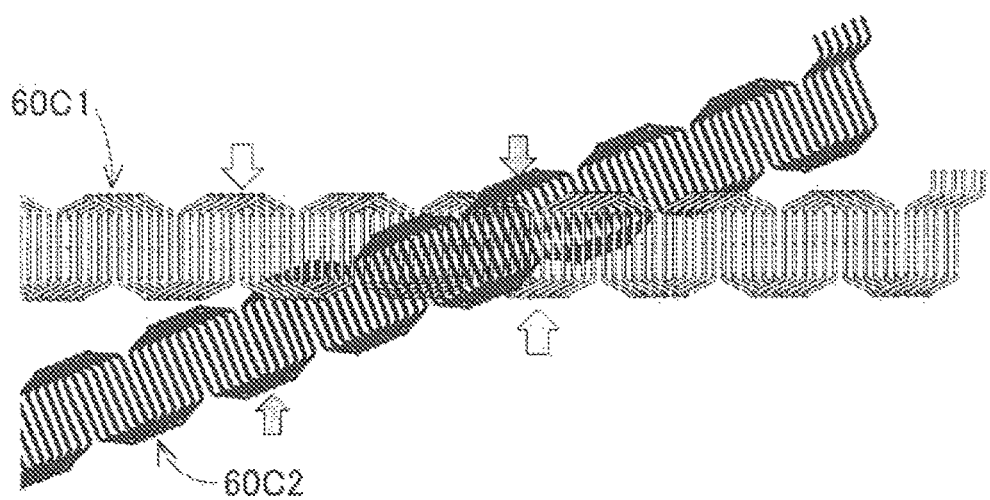
FIG. 23 is an explanatory diagram illustrating an interlacing location in interlacing a bundle of six continuous coil wires and another bundle of six continuous coil wires according to the first embodiment.
Figure 24:
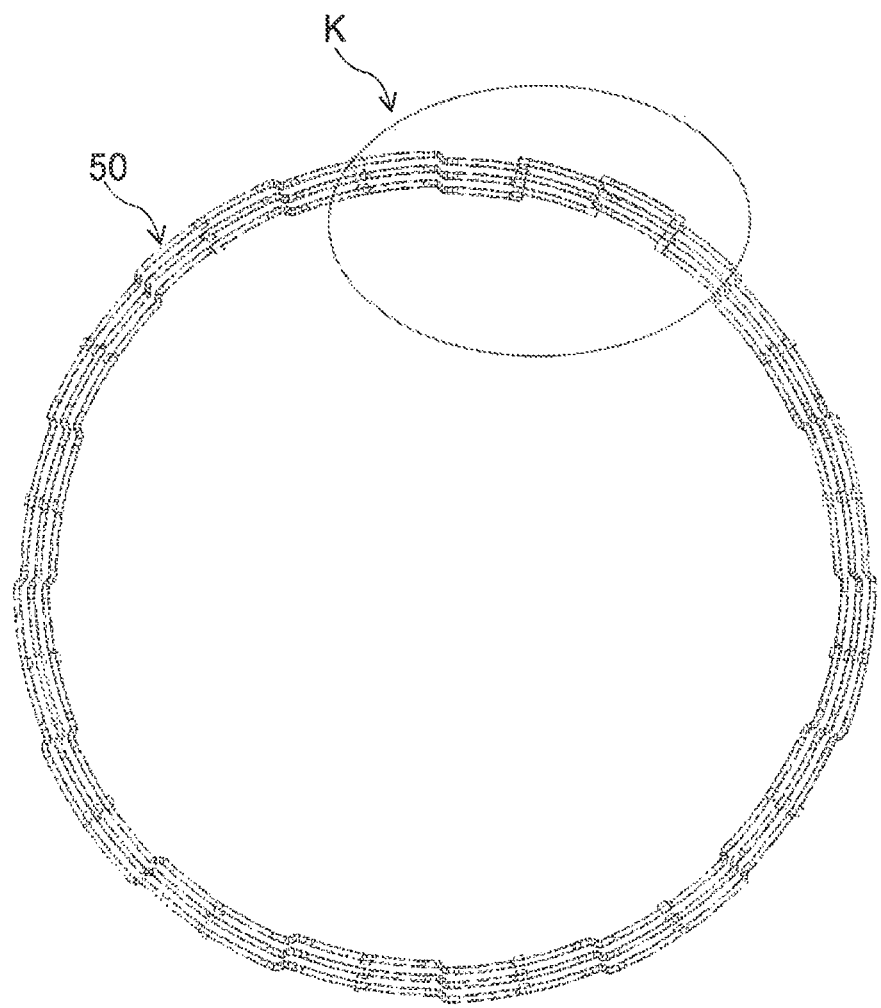
FIG. 24 is a plan view, from one coil end part side, of one continuous coil wire extracted from the cylindrical-shaped stator coil according to the first embodiment.
Figure 25:
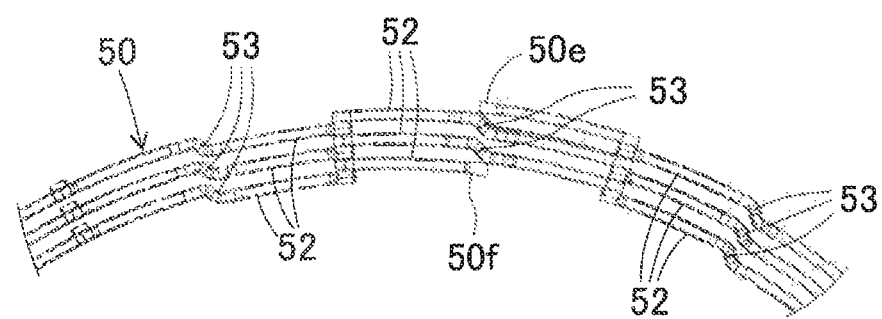
FIG. 25 is an enlarged plan view showing a part K of FIG. 24 through enlargement.
Figure 26:
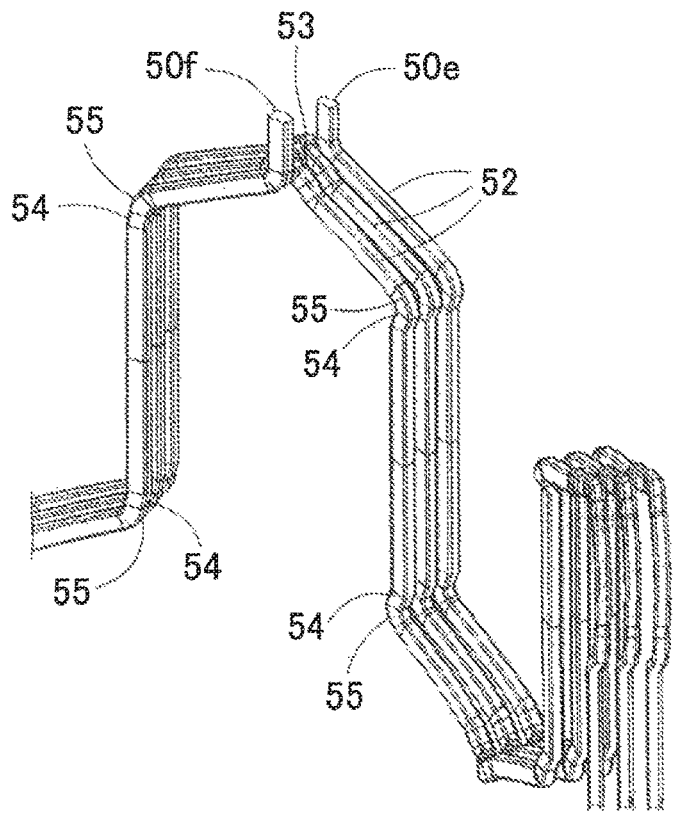
FIG. 26 is an enlarged perspective view showing the part K of FIG. 24 through enlargement.

In this case, as shown in FIG. 23, each transposition location between the first and second coil wire bundles 60C1 and 60C2 exists between adjacent two turn portion groups of the first and second coil wire bundles 60C1 and 60C2 (locations indicated with arrows). Consequently, the twelve continuous coil wires 50A-50C constituting the first and second coil wire bundles 60C1 and 60C2 are bundled into a state of being offset from one another by one slot-pitch in the longitudinal direction.

In addition, in the present embodiment, the transposition locations between the continuous coil wires 50 are set at intervals of 2.5 ridges as described above. Therefore, in the range where the continuous coil wires 50 extend in the circumferential direction of the stator core 30 by one complete turn, all of the intervals between adjacent transposition locations are equal to 2.5 ridges (i.e., greater than or equal to the circumferential length of one turn portion 52). Consequently, the coil wire bundle 60 is interlaced not into a dense state as in the case of ordinary interlacing where the intervals are equal to 0.5 ridges, but into a loose state. Hence, during the bundling of the continuous coil wires 50, it is difficult for stress to act on the continuous coil wires 50 and thus it is difficult for the continuous coil wires 50 to be plastically deformed. As a result, it becomes possible to facilitate the process of bundling the continuous coil wires 50 and the subsequent process of assembling the stator core 30 and the stator coil 40.

The stator coil 40 of the present embodiment is formed by spirally rolling the band-shaped coil wire bundle 60D, which is obtained by bundling the twelve continuous coil wires 50 as described above, three turns into the cylindrical shape (see FIG. 6). In addition, in FIGS. 24-26, there is shown one of the twelve continuous coil wires 50 which is extracted from the cylindrical-shaped stator coil 40. In FIGS. 24-26, 50e designates a terminal portion of the continuous coil wire 50 at one end thereof, while 50f designates a terminal portion of the continuous coil wire 50 at the other end thereof. The stator coil 40 is constituted of three phase windings that are star-connected at their respective ends; each of the phase windings is constituted of two parallel windings that are connected in parallel to each other. In addition, each of the parallel windings is constituted of two of the twelve continuous coil wires 50; the two continuous coil wires 50 are connected in series with each other.

The stator coil 40 and the stator core 30 are assembled as follows. The teeth 34 of each of the core segments 32 are inserted into the cylindrical-shaped stator coil 40 from the outer peripheral side thus all of the core segments 32 are assembled into the annular shape along the stator coil 40. Then, the cylindrical outer cylinder 37 is fitted onto the outer peripheries of the core segments 32 by, for example, press-fitting or shrink fitting. Consequently, as shown in FIGS. 1-4, the stator coil 40 is assembled to the stator core 30 so that predetermined in-slot portions 51 of each of the continuous coil wires 50 are received in predetermined slots 31 of the stator core 30.

In this case, for each of the continuous coil wires 50, the in-slot portions 51 of the continuous coil wire 50 are received in every predetermined number (3 (phases)×2 (double slot)=6 in the present embodiment) of the slots 31. Moreover, in each of the slots 31, there are arranged a predetermined number (6 in the present embodiment) of the in-slot portions 51 of the continuous coil wires 50 so as to be radially aligned in a row. Furthermore, the turn portions 52 of the continuous coil wires 50 connecting adjacent in-slot portions 51 protrude from the respective ones of the two axial end faces 30a of the stator core 30. Consequently, at both axial ends of the stator coil 40, there are annular coil end parts 41 and 42 respectively formed of the protruding turn portions 52 (see FIGS. 1-4).

Figure 27:
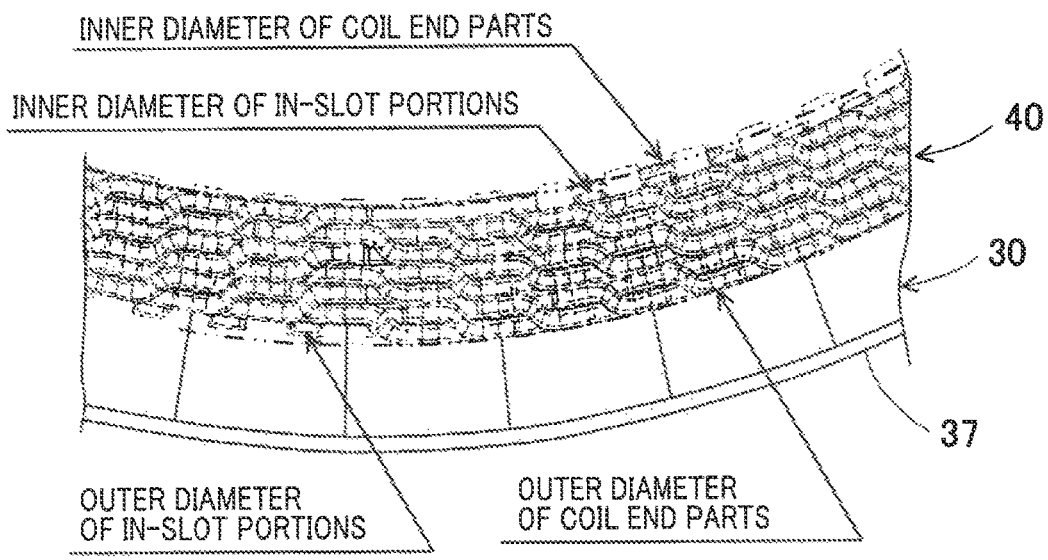
FIG. 27 is an enlarged view showing part of the stator according to the first embodiment through enlargement.

In the present embodiment, at the root parts of the turn portions 52 respectively connected with the ends of the in-slot portions 51, there are provided the first crank portions 54; the amount A1 of radial bending of the first crank portions 54 is set to be half of the radial width C1 of the in-slot portions 51. Therefore, as shown in FIG. 27, the inner diameter of the coil end parts 41 and 42 is less than the inner diameter of the in-slot portions 51 by the radial width C1 of the in-slot portions 51; the outer diameter of the coil end parts 41 and 42 is greater than the outer diameter of the in-slot portions 51 by the radial width C1 of the in-slot portions 51.

As described above, in the stator 20 of the rotating electric machine according to the present embodiment, each of the continuous coil wires 50 has, at the root parts of the turn portions 52 respectively connected with the ends of the in-slot portions 51, the first crank portions 54 that are radially bent. The amount A1 of radial bending of the first crank portions 54 is set to be half of the radial width C1 of the in-slot portions 51. Consequently, it becomes possible to set the amount A1 of radial bending and the extending-direction length of the first crank portions 54 to be respectively halves of those in the case of providing the first crank portions 54 only on one side of the in-slot portions 51. Hence, it becomes possible to provide the first crank portions 54 outside the respective axial end faces 30a of the stator core 30. As a result, it becomes possible to suppress the protruding height of the turn portions 52, which protrude from the respective axial end faces 30a of the stator core 30, to be low without providing cuts in wall surfaces of the stator core 30 which define the slots 31. Moreover, it also becomes possible to minimize reduction in cross-sectional area of the first crank portions 54; thus it becomes possible to suppress increase in the electrical resistance, thereby preventing the performance from being lowered due to heat generated by the first crank portions 54.

Moreover, in the present embodiment, the first crank portions 54 are provided on both sides of each of the in-slot portions 51. Consequently, it becomes possible to achieve the above-described advantageous effects while more reliably preventing interference between the continuous coil wires 50.

Moreover, the amount A1 of radial bending of the first crank portions 54 is set to be half of the amount of radial position change by the second crank portions 53. Hence, the amount A1 of radial bending and the extending-direction length of the first crank portions 54 can be set to be respectively halves of those in the case of providing the first crank portions 54 only on one side of the in-slot portions 51. Consequently, it becomes possible to achieve the same advantageous effects as achievable by setting the amount A1 of radial bending of the first crank portions 54 to be half of the radial width C1 of the in-slot portions 51. Further, since the amount A1 of radial bending of the first crank portions 54 is set to be constant, it becomes possible to stably achieve the above-described advantageous effects.

Moreover, in the present embodiment, each of the turn portions 52 has, at both the ends thereof, the bent R portions 55 that are circumferentially bent so as to be curved. Each of the first crank portions 54 is provided to overlap part of one of the bent R portions 55. Consequently, it becomes possible to suppress the protruding height h of the turn portions 52, which protrude from the respective axial end faces 30a of the stator core 30, to be low.

Figure 29:
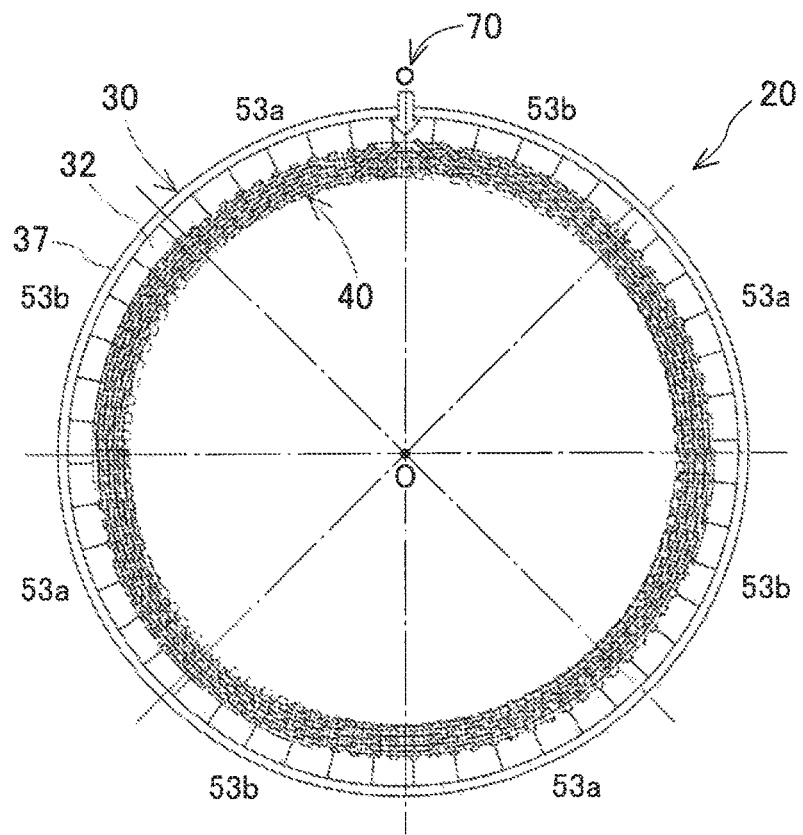
FIG. 29 is a front view illustrating the cooling liquid dripping from the nozzle of the cooling device onto one of the coil end parts of the stator coil according to the first embodiment.

Moreover, in the present embodiment, the recesses 56 are formed between the first crank portions 54 and the respective axial end faces 30a of the stator core 30. Further, as shown in FIG. 29, in the coil end parts 41 and 42 of the stator coil 40, regions where the second crank portions 53a are provided are arranged in the circumferential direction alternately with regions where the second crank portions 53b are provided. Therefore, when the stator 20 of the present embodiment is applied to a rotating electric machine which includes a cooling device for cooling the stator 20 with a cooling liquid, it is possible to achieve a good cooling effect.

Figure 28:
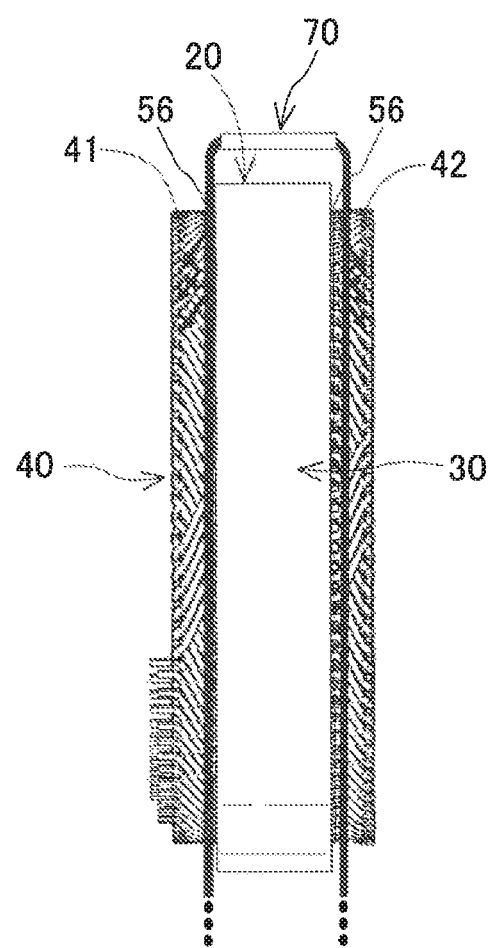
FIG. 28 is a side view illustrating a cooling liquid dripping from a nozzle of a cooling device onto both coil end parts of the stator coil according to the first embodiment.
Figure 30:
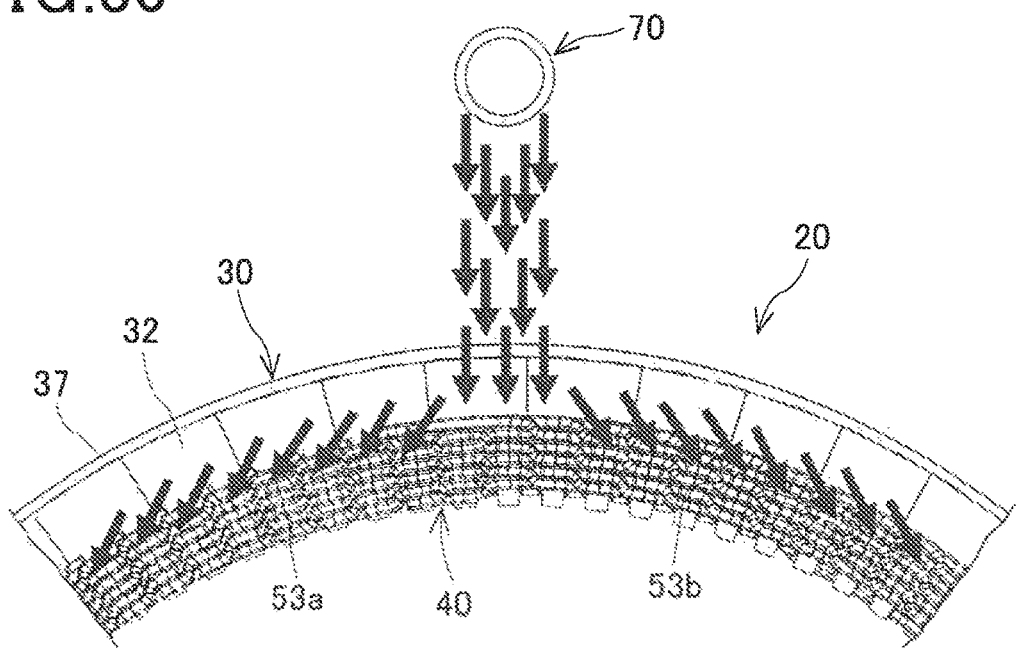
FIG. 30 is an enlarged view showing part of FIG. 29 through enlargement.

Specifically, as shown in FIGS. 28 and 29, the rotating electric machine including the cooling device is arranged so that the axis of the stator 20 is oriented in a horizontal direction. On the upper side of the stator 20, there is arranged a nozzle 70 to discharge the cooling liquid onto upper portions of both the coil end parts 41 and 42 of the stator coil 40. In this case, as shown in FIG. 30, each of the coil end parts 41 and 42 of the stator coil 40 is arranged so that at an uppermost area of an axially outer end surface of the coil end part, a plurality of second crank portions 53a are located from a circumferential center toward one circumferential side (counterclockwise direction) while a plurality of second crank portions 53b are located from the circumferential center toward the other circumferential side (clockwise direction).

Consequently, the cooling liquid discharged from the nozzle 70 onto the upper portion of each of the coil end parts 41 and 42 flows toward both the circumferential sides through the second crank portions 53a and 53b. In this case, in the coil end parts 41 and 42, those regions where the second crank portions 53a are provided are arranged in the circumferential direction alternately with those regions where the second crank portions 53b are provided. Therefore, the cooling liquid, which flows through the second crank portions 53a and 53b, flows while changing its flow direction. Consequently, it becomes easy for the cooling liquid to flow over a wide range in the coil end parts 41 and 42; and the staying time of the cooling liquid in the coil end parts 41 and 42 is increased. Moreover, it is easy for the cooling liquid, which has flowed into the recesses 56 formed between the first crank portions 54 and the respective axial end faces 30a of the stator core 30, to stay in the recesses 56 for a long time. By the above factors, it is possible to achieve a good cooling effect.

DESCRIPTION OF REFERENCE SIGNS

20: stator; 30: stator core; 30a: end faces; 31: slots; 40: stator coil; 41, 42: coil end parts; 50, 50A-50C: continuous coil wires; 51: in-slot portions; 52: turn portions; 53, 53a, 53b: second crank portions; 54: first crank portions; 55: bent R portions; 56: recesses; A1: amount of bending of each first crank portion; B1: extending-direction length of each first crank portion; C1: radial width of each in-slot portion; L1: reference line; O: central axis of stator core.

The invention claimed is:

1. A stator of a rotating electric machine, the stator comprising:
    a stator core having a plurality of slots arranged in a circumferential direction; and
    a stator coil formed by wave-winding a plurality of continuous coil wires on the stator core, each of the continuous coil wires having a plurality of in-slot portions received in the slots and a plurality of turn portions each of which connects, on the outside of the slots, one pair of the in-slot portions,
    wherein
    each of the continuous coil wires has, at root parts of the turn portions respectively connected with ends of the in-slot portions, first crank portions (54) that are radially bent, and
    an amount of radial bending of the first crank portions is set to be half of a radial width of the in-slot portions.

2. The stator of the rotating electric machine as set forth in claim 1, wherein the first crank portions are provided on both sides of each of the in-slot portions.

3. The stator of the rotating electric machine as set forth in claim 1, wherein each of the continuous coil wires has, at an apex part of each of the turn portions, a second crank portion that radially layer-changes the pair of in-slot portions respectively connected with two ends of the turn portion, the apex part being located furthest from the stator core axially outward in the turn portion, and
    the amount of radial bending of the first crank portions is set to be half of an amount of radial position change by the second crank portions.

4. The stator of the rotating electric machine as set forth in claim 1, wherein the amount of radial bending of the first crank portions is set to be constant.

5. The stator of the rotating electric machine as set forth in claim 1, wherein each of the turn portions has, at both ends thereof, bent R portions that are circumferentially bent so as to be curved, and
    each of the first crank portions is provided to overlap at least part of one of the bent R portions.

6. The stator of the rotating electric machine as set forth in claim 1, wherein recesses are formed between the first crank portions and respective axial end faces of the stator core.

7. The stator of the rotating electric machine as set forth in claim 1, wherein each of the continuous coil wires has, at an apex part of each of the turn portions, a second crank portion that slants relative to a reference line toward the circumferential direction, the reference line radially extending from a central axis of the stator core, the apex part being located furthest from the stator core axially outward in the turn portion,
    the second crank portions formed in the turn portions of the continuous coil wires comprise first-type second crank portions and second-type second crank portions, a slanting direction of the first-type second crank portions relative to the respective reference lines toward the circumferential direction being different from a slanting direction of the second-type second crank portions relative to the respective reference lines toward the circumferential direction, and
    in coil end parts of the stator coil which protrude axially outward respectively from two axial end faces of the stator core, regions where the first-type second crank portions are provided are arranged in the circumferential direction alternately with regions where the second-type second crank portions are provided.

* * * * *